(12) United States Patent
McNutt

(10) Patent No.: US 7,966,347 B2
(45) Date of Patent: Jun. 21, 2011

(54) GENERATING A VALUE ASSOCIATED WITH ONE OF A PLURALITY OF LEAF NODES BY IMPLICITLY RANDOMLY CLIMBING AN IMPLICIT TREE HAVING THE LEAF NODES

(75) Inventor: Bruce McNutt, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 515 days.

(21) Appl. No.: 12/030,108

(22) Filed: Feb. 12, 2008

(65) Prior Publication Data

US 2009/0204623 A1    Aug. 13, 2009

(51) Int. Cl.
*G06F 7/00* (2006.01)
(52) U.S. Cl. .................. 707/797; 707/761; 707/778
(58) Field of Classification Search ............ 707/797, 707/761, 778, 3
See application file for complete search history.

(56) References Cited

U.S. PATENT DOCUMENTS

| | | | | |
|---|---|---|---|---|
| 5,379,422 | A * | 1/1995 | Antoshenkov | 1/1 |
| 5,649,023 | A * | 7/1997 | Barbara et al. | 382/159 |
| 5,930,497 | A | 7/1999 | Cherian et al. | |
| 6,567,815 | B1 | 5/2003 | Rubin et al. | |
| 6,711,562 | B1 * | 3/2004 | Ross et al. | 1/1 |
| 7,007,123 | B2 * | 2/2006 | Golla et al. | 710/243 |
| 7,165,147 | B2 | 1/2007 | Ting et al. | |
| 7,203,909 | B1 | 4/2007 | Horvitz et al. | |
| 7,543,054 | B1 * | 6/2009 | Bansod et al. | 709/224 |
| 2002/0130907 | A1 | 9/2002 | Chi et al. | |
| 2009/0018984 | A1 * | 1/2009 | Solinsky | 706/12 |

OTHER PUBLICATIONS

A. Fiat et al., "Competitive Access Time Via Dynamic Storage Rearrangement", Foundations of Computer Science 1995, IEEE, pp. 392-401.

\* cited by examiner

*Primary Examiner* — Shahid A Alam
*Assistant Examiner* — Donald Lawson
(74) *Attorney, Agent, or Firm* — David W. Victor; Konrad Raynes and Victor LLP

(57) ABSTRACT

Provided are a method, system and article of manufacture for generating a value associated with one of a plurality of leaf nodes by implicitly randomly climbing an implicit tree having the leaf nodes. A determination is made of an ancestor node of a current node, wherein each ancestor node at a level of the ancestor node is associated with a different set of ordered leaf nodes, wherein there is a unique value associated with each leaf node. A determination is made of a first leaf node of the ordered leaf nodes associated with the determined ancestor node. A determination is made as to whether the determined ancestor node is a rightmost ancestor node at the level of the ancestor node. A first formula is used to determine a last leaf node of the ordered leaf nodes associated with the determined ancestor node in response to determining that the ancestor node is the rightmost ancestor node. A second formula different form the first formula is used to determine the last leaf node in response to determining that the ancestor node is the rightmost ancestor node. A value associated with a selected leaf node is generated that is between the determined first and last leaf nodes in response to determining to climb to the ancestor node of the current node and in response to determining not to climb to a further ancestor node of the determined ancestor node, wherein the generated value is used in a computational process.

19 Claims, 3 Drawing Sheets

```
1   First_Leaf = Last_Leaf = Current_Node = Selected_Leaf
2   Current_Rightmost_Node = Total_Leaves - 1
3   Current_Level = 0
4   while 1:
5       Next_Node = floor(Current_Node/ 2)
6       Next_Rightmost_Node = floor((Current_Rightmost_Node-1) / 2)
7       if (Next_Node >= Next_Rightmost_Node):
8           Next_Node = Next_Rightmost_Node
9           Next_First_Leaf = Next_Node * 2 ^ (p+1)
10          Next_Last_Leaf = Total_Leaves - 1
11          if (Current_Rightmost_Node % 2 == 0): C_here = C_3
            else: C_here = C_2
12      else:
13          Next_First_Leaf = Next_Node * 2 ^ (p+1)
14          Next_Last_Leaf = Next_First_Leaf + 2 ^ (p+1) - 1
15          C_here = C_2
16      if (Random <= C_here or p < k): climbing = True
17      else: climbing = False
18      if climbing and (Current_Rightmost_Node > 0):
19          Current_First_Leaf = Next_First_Leaf;
20          Current_Last_Leaf = Next_Last_Leaf;
21          Current_Node = Next_Node;
22          Current_Rightmost_Node = Next_Rightmost_Node; p = p+1
23      else: break
```

GENERATING A VALUE ASSOCIATED WITH ONE OF A PLURALITY OF LEAF NODES BY IMPLICITLY RANDOMLY CLIMBING AN IMPLICIT TREE HAVING THE LEAF NODES

BACKGROUND OF THE INVENTION

1. Field of the Invention

The present invention relates to a method, system, and article of manufacture for generating a value associated with one of a plurality of leaf nodes by implicitly randomly climbing an implicit tree having the leaf nodes.

2. Description of the Related Art

As part of benchmark testing process of storage devices, realistic access patterns of storage locations, such as tracks, blocks, etc., of the storage device must be generated so that Input/Output (I/O) requests may be directed to the randomly generated storage locations according to a realistic access pattern. In this way, the testing process generates test I/O requests in a realistic access pattern to storage locations in the storage device. The prior art technique for randomly generating storage locations to use in the benchmark testing assumes that the number of storage locations of storage being accessed is a power of two.

To select a storage location of the power of two number of storage locations, the testing process models the number of storage locations as the leaves of a binary tree of height H_max. The ancestors of any given track number $0<=v<=2^{H\_max}-1$ are identified implicitly by the binary representation of the number v. For example, suppose that H_max=3. Then any of the eight available track numbers v can be represented as a three-digit binary number. The parent of any track v, in turn, can be represented as a two digit binary number, obtained by dropping the last binary digit of the number v; the grandparent can be represented as a one digit binary number, obtained by dropping the last two binary digits of the number v; and all tracks have the same great-grandparent.

Starting from a given leaf $v_i$ of the tree, the next leaf $v_{i+1}$ is determined as follows. First, climb a number of nodes $0<=k<<H\_max$ above leaf $v_i$. Then, with probability C, climb one node higher; with another probability of C, climb an additional node higher; and so on (but stop at the top of the tree). Finally, select a leaf at random from all of those belonging to the subtree under the current node. This technique of calculating a leaf node by implicitly randomly climbing a binary tree is further described in U.S. Pat. No. 5,930,497.

There is a need in the art for improved techniques for generating a random number by implicitly random walking up a tree when the tree is not limited to a number of leaves that are a power of two.

SUMMARY

Provided are a method, system and article of manufacture for generating a value associated with one of a plurality of leaf nodes by implicitly randomly climbing an implicit tree having the leaf nodes. A determination is made of an ancestor node of a current node, wherein each ancestor node at a level of the ancestor node is associated with a different set of ordered leaf nodes, wherein there is a unique value associated with each leaf node. A determination is made of a first leaf node of the ordered leaf nodes associated with the determined ancestor node. A determination is made as to whether the determined ancestor node is a rightmost ancestor node at the level of the ancestor node. A first formula is used to determine a last leaf node of the ordered leaf nodes associated with the determined ancestor node in response to determining that the ancestor node is the rightmost ancestor node. A second formula different form the first formula is used to determine the last leaf node in response to determining that the ancestor node is the rightmost ancestor node. A value associated with a selected leaf node is generated that is between the determined first and last leaf nodes in response to determining to climb to the ancestor node of the current node and in response to determining not to climb to a further ancestor node of the determined ancestor node, wherein the generated value is used in a computational process.

BRIEF DESCRIPTION OF THE DRAWINGS

FIG. 4 illustrates an embodiment of pseudo code to generate a random value.

DETAILED DESCRIPTION

Figure 1:
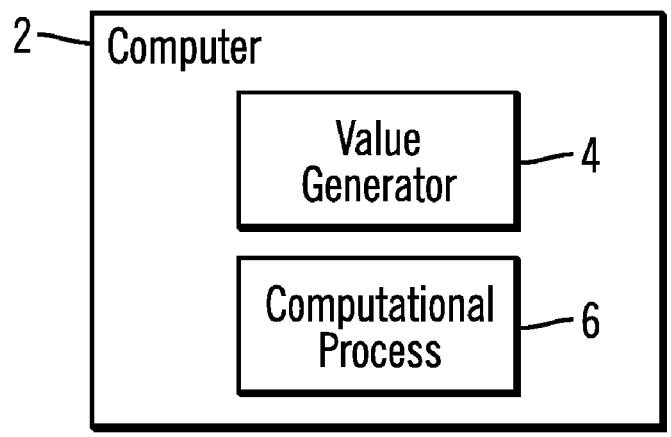
FIG. 1 illustrates an embodiment of a computing environment.

FIG. 1 illustrates an embodiment of a computing environment. A computer 2 includes a value generator 4 for generating a random value and a computational process 6 that consumes the random value produced by the value generator 4 for a computational purpose. The value generator 4 and computational process 6 may be implemented as software stored in a computer readable storage medium, e.g., memory, storage, etc., that is executed by a processor in the computer 2 or implemented as hardware logic in a hardware device, such as an application specific integrated circuit included in the computer 2.

In one embodiment, the value generator 4 selects values that are implicitly modeled as leaves in a tree having either all binary nodes/leaves or all binary nodes except the rightmost node/leaf. To select a value associated with the leaves, the value generator 4 uses a random process to implicitly climb up the tree to an ancestor node $P_i$ of a previously selected leaf $L_i$ and then randomly select one of the leaves in a subtree of the parent node $P_i$. To implicitly climb the tree, the value generator 4 uses an algorithm to calculate ancestor (e.g., parent) and leaf nodes in a manner that does not rely on any actual implementation of a tree in a data structure to traverse. An ancestor node to a leaf node comprises the immediate parent and any other further parent nodes, e.g., grandparents, great grandparents, etc., up to the root node.

Figure 2:
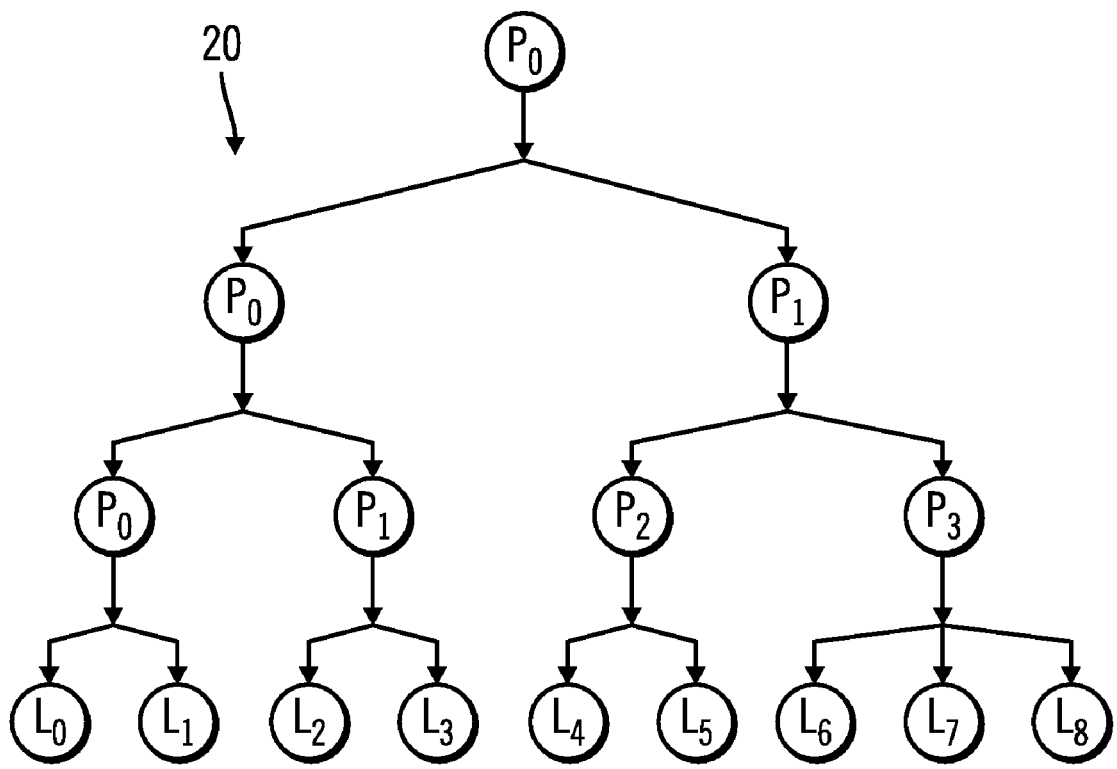
FIG. 2 illustrates an example of a tree having leaf and parent nodes.

FIG. 2 provides an example of a tree 20 having mostly binary nodes and one first level rightmost parent node $P_3$ having three leaves $L_6, L_7, L_8$. In further embodiments, the tree may have an even number of leaves, but an odd number of parent nodes at one level, whose further parent node would form a tertiary tree. In one embodiment, although the value generator 4 executes an algorithm to perform calculations that simulate random climbing of a tree to randomly select a leaf associated with a value for use by the computational process 6, the value generator 4 would not maintain a data structure providing a representation of the tree 20.

In one embodiment, the computational process 6 may comprise a storage device testing program that generates Input/Output (I/O) requests toward a storage device to perform benchmark testing of the storage device. In such an embodiment, the leaves of the tree 20 are associated with ordered storage locations, and the value generator 4 randomly selects leaves to provide a random access pattern of storage locations associated with the selected leaves to the storage device testing process to use as the storage locations to which the I/O test requests are directed. In alternative embodiments, the computational process 6 may comprise any type of suitable process that requires a random value that is localized with respect to other random values. By producing a value that is a leaf associated (in a subtree of) a randomly selected parent node in the tree 20, the value generator 4 tends to randomly select localized values before randomly climbing to a relatively higher ancestor (e.g., parent) node to move to a leaf node more distant from the previously selected leaf node.

Figure 3:
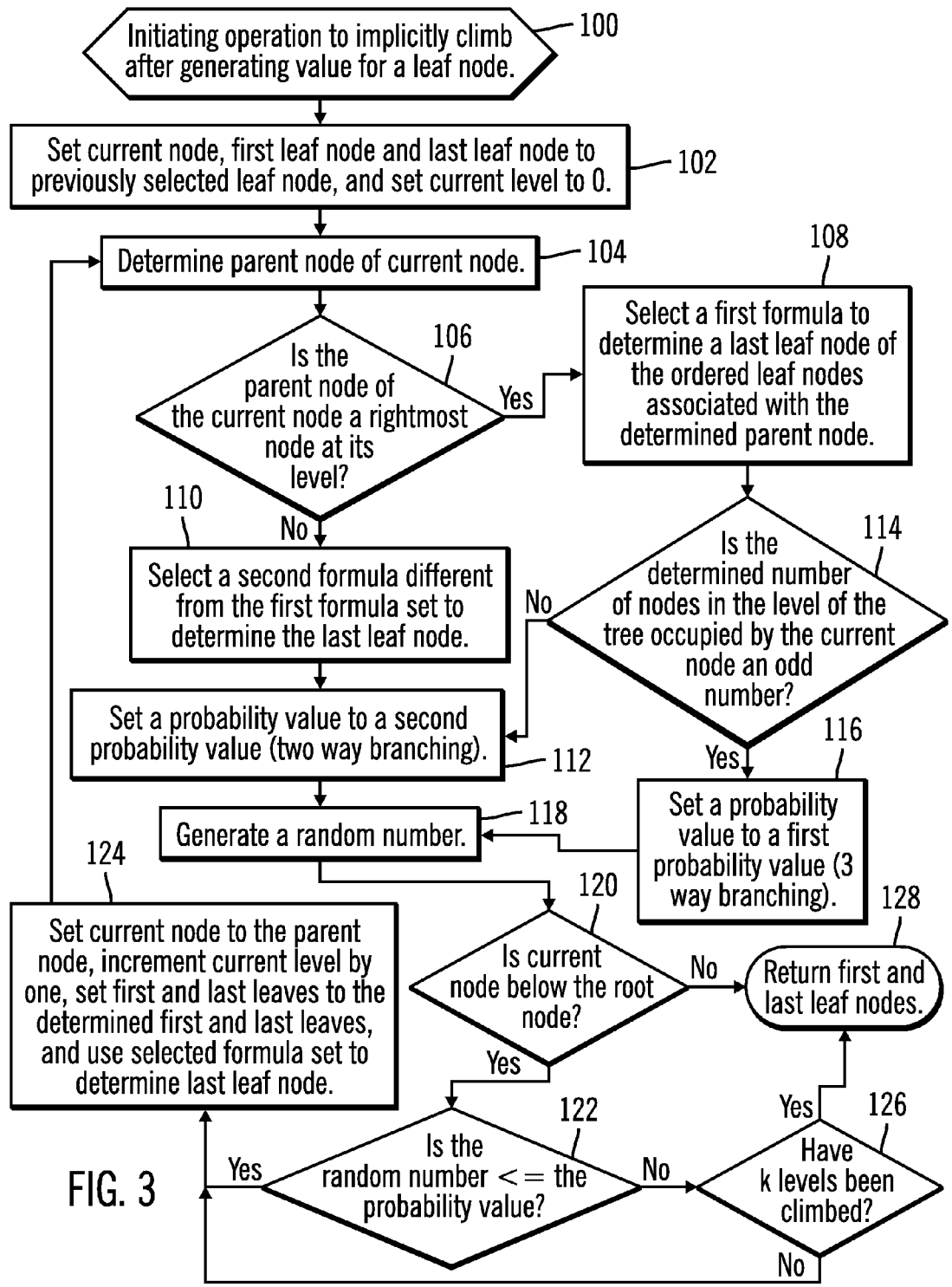
FIG. 3 illustrates an embodiment of operations to generate a random value.

FIG. 3 illustrates an embodiment of operations performed by the value generator 4 to calculate a random ancestor node $P_i$ to which to climb from a previously accessed leaf node $L_i$. Each ancestor node $P_i$ at a level of ancestor nodes is associated with a different set of ordered leaf nodes $L_i$. The ordered leaf nodes associated with an ancestor node may be conceptualized as leaves of a subtree of the ancestor node. For instance, leaf nodes $L_0$ and $L_1$ are a subtree of the first level parent node $P_0$. The computational process 6 may request a value from the value generator 4 or the value generator 4 may continually provide random values from selected leaf nodes. Upon initiating (at block 100) an operation to implicitly climb to a random ancestor node $P_i$ after generating a value for a leaf node $L_i$, the value generator 4 initializes (at block 102) a current node, first leaf node and last leaf node values to a previously selected leaf node $L_i$ for which a random value was provided and sets the current level in the tree to zero, indicating the last leaf level. The current node may comprise a leaf node $L_i$ or any of the parent nodes $P_0$ reached during a previous iteration of the operations at blocks 104 through 124. At the beginning of the algorithm, the current node is set to the previously accessed leaf node at block 102.

The value generator 4 determines (at block 104) a parent node $P_i$ of the current node, where the current node may comprise a leaf node $L_i$ or an parent node $P_i$ at any of the levels of the implicit tree. In one embodiment, the parent node may comprise the quotient of the current node divided by two.

If (at block 106) the determined parent node is a rightmost node at its level, then the value generator 4 selects (at block 108) a first formula to determine a last leaf node of the ordered leaf nodes associated with the determined parent node; otherwise, the value generator selects (at block 110) a second formula, different form the first formula, to determine a last leaf node of the ordered leaf nodes associated with the determined parent node. The rightmost node at the parent level of the current node (which may comprise the leaf or higher level ancestor node), used in the determination at block 106, may comprise the quotient of the result of dividing the number of nodes at the current level minus one by two.

If (at block 106), the second formula is selected, which occurs if the parent node is not the rightmost node at its level, then the climbing probability is set (at block 112) to a second probability value for two way branching. If the parent node is the rightmost node, which results in the first formula being selected (at block 108), then a determination is made (at block 114) whether a number of nodes/leaves in the level of the tree occupied by the current node an odd or even integer. If (at block 114) there are an odd number of nodes/leaves, then a probability value is set (at block 116) to a first probability value, for three way branching. An odd number of nodes would occur if the number of nodes at the current node level was not binary. Otherwise, if there are an even number of nodes (or leaves) at the level of the current node, then there are a binary number of nodes at the current node level and the probability value is set (at block 112) to the second probability value for two way branching.

A random number is generated (at block 118). If (at block 120) the current node is below the root node and if (at block 122) the random number is less than or equal to the probability value or the process has not climbed at least a minimum number of levels (k), then the random process proceeds to block 124 to perform another iteration of the operations to implicitly climb to the next parent node to determine a larger set of associated leaf nodes from which to randomly select the leaf node. At block 124, the current node is set to the parent node, the tree level is incremented by one, and the first and last leaves are set to the determined first and last leaves. The selected formula is used to determine the last leaf node at the current level. The first and second formulas may determine the first leaf node by calculating the result of the number of the parent node, e.g., 0, 1, 2 . . . , times a number of leaf nodes associated with any node to the left of the parent node and at the parent node's level, where all branching in the subtree associated with such a node is binary." For instance, the ancestor nodes are integers numbered from 0 upwards from left to right. In this way, the value generator 4 calculates the next first leaf node without using a representation of a tree 20, but determines nodes and leaves implicitly.

In one embodiment, the first formula, which is used if the parent node is the rightmost parent node at the level, may set the last leaf node to a rightmost leaf node of the plurality of ordered leaf nodes. In one embodiment, the second formula, which is used if the parent node is not the rightmost parent node at the level, may set the last leaf node to a leaf node number comprising a number of the first leaf node plus a number of leaf nodes associated with the determined parent node other than the first leaf node.

If (at block 122) the random number is greater than the probability value and if (at block 126) the minimum number of levels have been not been climbed, then control proceeds to block 124 to perform another iteration of climbing. If (at block 122) the random number is greater than the probability value and if (at block 126) the minimum number of levels have been climbed, then control ends and the value generator 4 does not implicitly climb to the next level and the previously set first and last leaf nodes of the current node are returned (at block 128). Further, if (at block 120) the current node is the root node, then control proceeds to block 128.

The value generator 4 may randomly select a leaf node from the set of leaf nodes between the returned first and last leaf nodes. From the randomly selected leaf node, the value generator 4 may determine the value associated with the randomly selected leaf node to provide to the computational process 6. As discussed, the leaf nodes may be associated with ordered values, ordered from the first leaf node to the last leaf node.

In one embodiment, the first probability value may be less than the second probability value, and the random number and first and second probability values may be real numbers between 0 and 1. A higher probability value means that there is a greater probability that the random number will be less than such probability value and a greater likelihood that the value generator 4 will climb to the next level to consider the next parent node. Thus, to the extent the nodes/leaves at a current level are even, there is a higher likelihood that the value generator will climb to the next level. The reason for this is that if the number of nodes/leaves are odd, then the rightmost parent node will have three children, as opposed to two. In such case, there will be more values in the subtree of the next higher level parent node. To maintain localization, the probability of climbing will be less when there are more values from which to choose, such as the case if there are three children.

The probability values associated with two and three way branching may be determined empirically based on probability values that results in a selected distribution of values that best models the distribution of values for the process being simulated. For instance, if the leaf nodes represent disk locations, then the probability values may be empirically or mathematically determined to best model disk access patterns.

FIG. 4 illustrates an embodiment of an algorithm using pseudo code notation that may be implemented in the value generator 4 to implement the operations described with respect to FIG. 3. At line 1, variables are initialized, such that a First_Leaf, Last_Leaf, and Current_Node variables are set to the last Selected_Leaf, which corresponds to step 102 in FIG. 3. At line 2, as part of the first iteration before climbing to a level, the Current_Rightmost_Node is set to the Total_Leaves minus 1, where during the first iteration, the Current_Rightmost_Node is the last leaf value, e.g., $L_8$ (FIG. 2). At line 3, during the first iteration, the Current_Level is zero, i.e., the first level of the leaf nodes ($L_i$). At line 4, a loop is started to implicitly climb a random number of levels up the implicit tree having multiple binary branches, and possibly a tertiary branch at a rightmost node at one or more levels.

At line 5, the Next_Node (which is the parent node to the current node) is set to the floor (Current_Node/2), which is the quotient of the Current_Node/2. This operation at line 5 corresponds to block 104 in FIG. 3. At line 6, the Next_Rightmost_Node is set to the floor ((Current_Rightmost_Node-1)/2), i.e., the quotation of the Current_Rightmost_Node minus 1, divided by two. The Next_Rightmost_Node corresponds to the rightmost parent node considered at block 106 in FIG. 3. At line 7, a determination is made as to whether the Next_Node (e.g., parent node) is greater than or equal to the Next_Rightmost_Node. If so, then the parent node (Next_Node) is the rightmost node and the operations at lines 8-11 are performed. The operation at line 7 corresponds to block 106 in FIG. 3 and the operations at lines 8-11 correspond to the operations of the first formula performed at block 108 in FIG. 3 if the parent node is the rightmost node. If the Next_Node is the rightmost node, then at line 8, the Next_Node is set to the Next_Rightmost_Node. Further, at line 9, the Next_First_Leaf is set to the Next_Node*$2^{(p+1)}$. At line 10, the Next_Last_Leaf is set to the Total_Leaves minus one. At line 11, a determination is made as to whether the remainder of the operation of dividing the Current_Rightmost_Node by two is 0 in order to determine whether there are an odd number of nodes/leaves at the current level because the numbering of the nodes/leaves starts at zero. The operation at line 11 corresponds to block 114 in FIG. 3. In such case of there being an odd number of nodes at the current level, then the probability value used (C_here) is the tertiary probability value (C_3). If there are an even number of nodes, then the probability value used (C_here) is set to the binary probability value (C_2). The operation at line 11 corresponds to the operations at blocks 114, 116, and 118 in FIG. 3.

At line 12, if the Next_Node (e.g., parent node) is not the rightmost node, then the operations at lines 13, 14, and 15 are performed. The operations at lines 13, 14, and 15 correspond to the operations performed by the second formula performed at block 110 in FIG. 3 if the parent node is not the rightmost node. At line 13, the same operation as performed at line 9 is performed to determine the first leaf node associated with (in the implicit subtree of) the Next_Node. At line 14, Next_Last_Leaf is set to the Next_First_Leaf+$2^{(p+1)}$-1. At line 15, the probability value used (C_here) is set to the binary probability value (C_2). The operation at line 15 corresponds to the operation at 112 in FIG. 3.

At line 16, a determination is made as to whether a random number is less than or equal to C_here, the probability value, or whether the number of levels climbed is less than k, where k is greater than or equal to zero and may comprise a small number that represents an initial number of climbing steps that should always be taken. The operation at line 16 corresponds to blocks 122 and 126 (FIG. 3). Climbing occurs if the random number is less than the probability value (C_here), where climbing is set at lines 16 or 17, or if the minimum number of levels have not been climbed as part of the current selection process. If climbing is to occur again, then at lines 19-22, the current node values are set to those calculated for the next parent node, Current_First_Leaf is set to the Next_First_Leaf, Current_Last_Leaf is set to the Next_Last_Leaf, Current_Node is set to the Next_Node, and Current_Rightmost_Node is set to the Next_Rightmost_Node; p=p+1. The operations at lines 19-22 correspond to block 124 in FIG. 3. If there is no climbing, then the loop is broken, and the first and leaf nodes and current nodes determined for the next parent level are not used, and the first and last leaf nodes associated with the current node, not the parent node, are used to randomly select the leaf node that will provide the associated value to use in the computational process 6, which corresponds to block 128 in FIG. 3.

With the described operations, to select a leaf node, the value generator 4 implicitly climbs a random number of levels of an implicit tree having multiple binary branches and at most one tertiary branch at one or more levels, to select an ancestor node from which one leaf node associated with the selected ancestor node is randomly selected. With this algorithm, leaf nodes are accessed in a localized access pattern, where the localization depends upon how many implicit levels the value generator 4 determines to implicitly climb. The greater the implicit levels value generator 4 climbs, the less likely the selected leaf node is local to the previously selected leaf node. This algorithm is particularly useful for situations where the ordered leaf nodes are associated with an ordered, such as sequential, storage locations. Storage access tends to have a greater likelihood of accessing storage locations closer to the recently accessed location. The above algorithm increases the likelihood of selecting leaf nodes representing storage locations that are localized with respect to the previously selected leaf node/storage location.

ADDITIONAL EMBODIMENT DETAILS

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic implemented in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

In the described embodiments, the access parameters are changed for process accesses to memory addresses in a shared memory. In an alternative embodiment, access patterns may be monitored for computer resources other than memory addresses, such as addresses in a storage device and other computer resources.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 3 and 4 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An article of manufacture comprising a computer readable storage medium including code executed to generate a value for use with a storage device testing process to test a storage device and to perform operations, the operations comprising:
   determining an ancestor node of a current node in a tree of nodes, wherein the ancestor node is at a higher level in the tree than the current node up to a root node of the tree, wherein each ancestor node at a level of the ancestor node is associated with a different set of ordered leaf nodes, wherein there is a unique block of storage value in the storage device associated with each leaf node;
   determining a first leaf node of the ordered leaf nodes associated with the determined ancestor node;
   determining whether the determined ancestor node is a rightmost ancestor node at the level of the ancestor node;
   using a first formula to determine a last leaf node of the ordered leaf nodes associated with the determined ancestor node in response to determining that the ancestor node is the rightmost ancestor node;
   using a second formula different from the first formula to determine the last leaf node in response to determining that the ancestor node is not the rightmost ancestor node;
   generating the block of storage value associated with a selected leaf node that is between the determined first and last leaf nodes in response to determining to climb to the ancestor node of the current node and in response to determining not to climb to a further ancestor node of the determined ancestor node; and
   returning the generated block of storage value to the storage device testing process to use to perform an Input/Output (I/O) operation with respect to the generated block of storage value for the purpose of testing the storage device.

2. The article of manufacture of claim 1, wherein using the first formula comprises setting the last leaf node to a rightmost leaf node of the plurality of ordered leaf nodes.

3. The article of manufacture of claim 1, wherein using the second formula comprises setting the last leaf node to a leaf node number comprising a number of the first leaf node plus a number of leaf nodes associated with the determined ancestor node other than the first leaf node.

4. The article of manufacture of claim 1, wherein the determining of the first leaf node comprises determining a number of the ancestor node times a number of leaf nodes associated with one of ancestor nodes at the level of the determined ancestor node that is associated with an even number of leaf nodes.

5. The article of manufacture of claim 1, further comprising:
using a random number to determine whether to climb to an ancestor node of the current node.

6. The article of manufacture of claim 5, wherein using the random number comprises:
setting a probability value to a first probability value in response to determining that a number of nodes at a level of the current node is an odd integer;
setting the probability value to a second probability value in response to determining that the number of nodes at the level of the current node is an even integer;
comparing the random number with the probability value to determine whether to climb to the ancestor node.

7. The article of manufacture of claim 6, wherein the determination to climb to the ancestor node is made in response to determining that the random number is less than or equal to the probability value, and wherein the first probability value is less than the second probability value.

8. The article of manufacture of claim 1, performing an additional iteration of the operations of determining the ancestor node, determining the first leaf node, determining whether the determined ancestor node is the rightmost ancestor node, using the first formula, and using the second formula in response to determining to climb to the further ancestor node.

9. A system, comprising:
a processor;
a computer readable storage medium including programs executed by the processor, the programs comprising:
a storage device testing process; and
a value generator executed to perform operations, the operations comprising:
determining an ancestor node of a current node in a tree of nodes, wherein the ancestor node is at a higher level in the tree than the current node up to a root node of the tree, wherein each ancestor node at a level of the ancestor node is associated with a different set of ordered leaf nodes, wherein there is a unique block of storage value in the storage device associated with each leaf node;
determining a first leaf node of the ordered leaf nodes associated with the determined ancestor node;
determining whether the determined ancestor node is a rightmost ancestor node at the level of the ancestor node;
using a first formula to determine a last leaf node of the ordered leaf nodes associated with the determined ancestor node in response to determining that the ancestor node is the rightmost ancestor node;
using a second formula different form the first formula to determine the last leaf node in response to determining that the ancestor node is not the rightmost ancestor node;
generating the block of storage value associated with a selected leaf node that is between the determined first and last leaf nodes in response to determining to climb to the ancestor node of the current node and in response to determining not to climb to a further ancestor node of the determined ancestor node; and
returning the generated block of storage value to the storage device testing process to use to perform an Input/Output (I/O) operation with respect to the generated block of storage value for the purpose of testing the storage device.

10. The system of claim 9, wherein using the first formula comprises setting the last leaf node to a rightmost leaf node of the plurality of ordered leaf nodes.

11. The system of claim 9, wherein using the second formula comprises setting the last leaf node to a leaf node number comprising a number of the first leaf node plus a number of leaf nodes associated with the determined ancestor node other than the first leaf node.

12. The system of claim 9, wherein the determining of the first leaf node comprises determining a number of the ancestor node times a number of leaf nodes associated with one of ancestor nodes at the level of the determined ancestor node that is associated with an even number of leaf nodes.

13. The system of claim 9, wherein the operations further comprise:
setting a probability value to a first probability value in response to determining that a number of nodes at a level of the current node is an odd integer;
setting the probability value to a second probability value in response to determining that the number of nodes at the level of the current node is an even integer;
comparing a random number with the probability value to determine whether to climb to an ancestor node.

14. A method, comprising:
determining an ancestor node of a current node in a tree of nodes, wherein the ancestor node is at a higher level in the tree than the current node up to a root node of the tree, wherein each ancestor node at a level of the ancestor node is associated with a different set of ordered leaf nodes, wherein there is a unique block of storage value in a storage device associated with each leaf node;
determining a first leaf node of the ordered leaf nodes associated with the determined ancestor node;
determining whether the determined ancestor node is a rightmost ancestor node at the level of the ancestor node;
using a first formula to determine a last leaf node of the ordered leaf nodes associated with the determined ancestor node in response to determining that the ancestor node is the rightmost ancestor node;
using a second formula different form the first formula to determine the last leaf node in response to determining that the ancestor node is not the rightmost ancestor node;
generating the block of storage value associated with a selected leaf node that is between the determined first and last leaf nodes in response to determining to climb to the ancestor node of the current node and in response to determining not to climb to a further ancestor node of the determined ancestor node; and
returning the generated block of storage value to a storage device testing process to use to perform an Input/Output (I/O) operation with respect to the generated block of storage value for the purpose of testing the storage device.

15. The method of claim 14, wherein using the first formula comprises setting the last leaf node to a rightmost leaf node of the plurality of ordered leaf nodes.

16. The method of claim 14, wherein using the second formula comprises setting the last leaf node to a leaf node number comprising a number of the first leaf node plus a number of leaf nodes associated with the determined ancestor node other than the first leaf node.

17. The method of claim 14, wherein the determining of the first leaf node comprises determining a number of the ancestor node times a number of leaf nodes associated with one of ancestor nodes at the level of the determined ancestor node that is associated with an even number of leaf nodes.

18. The method of claim 14, further comprising:

setting a probability value to a first probability value in response to determining that a number of nodes at a level of the current node is an odd integer;

setting the probability value to a second probability value in response to determining that the number of nodes at the level of the current node is an even integer;

comparing a random number with the probability value to determine whether to climb to the ancestor node.

19. The method of claim 14, performing an additional iteration of the operations of determining the ancestor node, determining the first leaf node, determining whether the determined ancestor node is the rightmost ancestor node, using the first formula, and using the second formula in response to determining to climb to the further ancestor node.

* * * * *